Sept. 20, 1932.  H. MILLER  1,878,287
METHOD OF TREATING DRY CLEANING FLUIDS
Filed Feb. 1, 1928
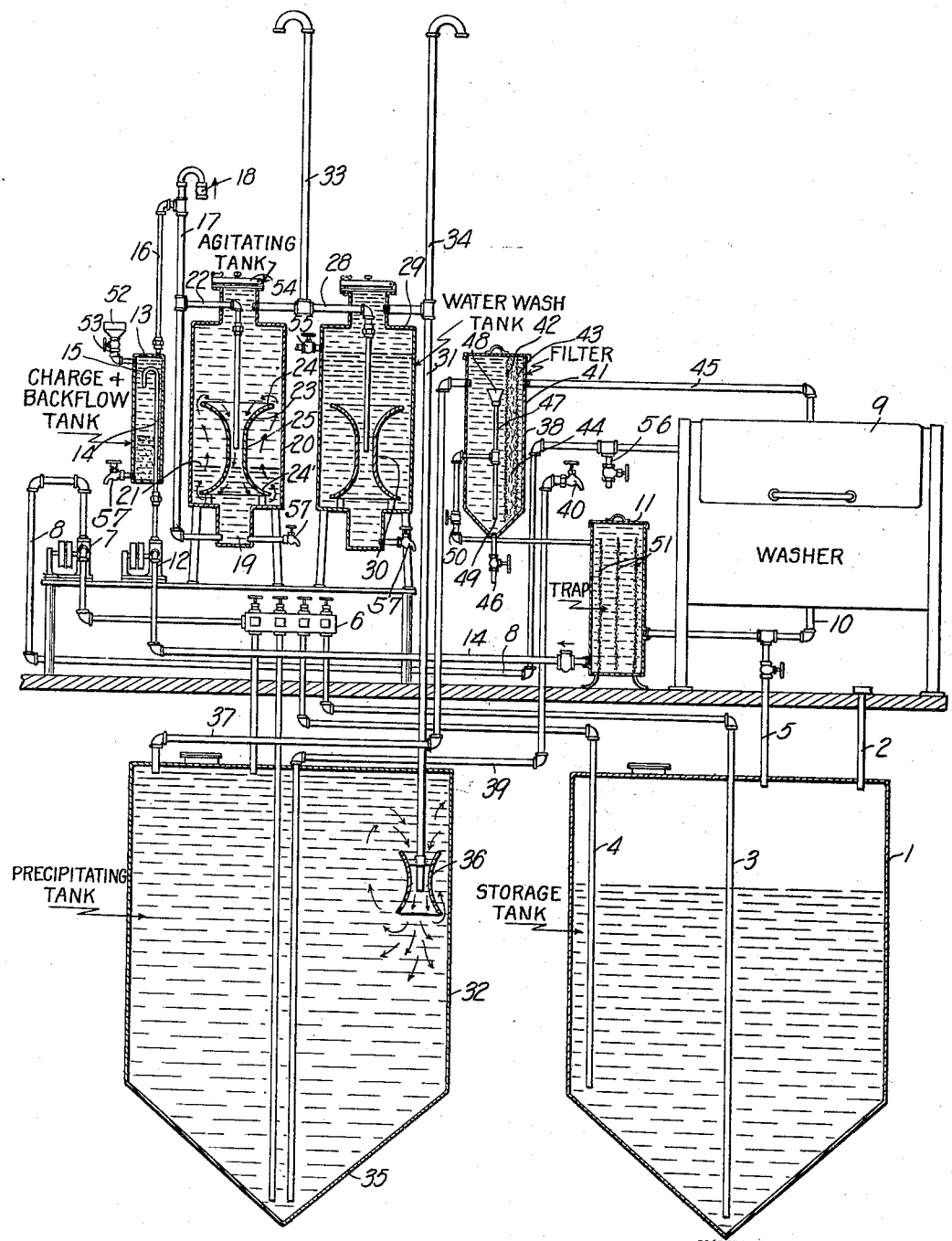
INVENTOR
Harry Miller
BY
ATTORNEY Patented Sept. 20, 1932

1,878,287

UNITED STATES PATENT OFFICE

HARRY MILLER, OF OKMULGEE, OKLAHOMA

METHOD OF TREATING DRY CLEANING FLUIDS

Application filed February 1, 1928. Serial No. 251,218.

My invention relates to a method of and apparatus for dry cleaning and has for its principal object to provide for treatment of dry cleaning fluids such as naphthas, benzols, gasoline blends and like solvents, to purify and free such solvents of contained foreign matter and disagreeable aromatic elements and thereby provide a clean, soft and penetrating fluid for cleaning purposes.

It is also an object of the invention to impart certain additional properties to the solvents for restoring luster and resilience to silk, cotton, wool or other materials that may be treated by the solvent.

In accomplishing these and other objects of the invention I bring the cleaning fluids into contact with a chloride of lime or chlorinated lime solution, quantities of which are mixed with the fluid and carried thereby into an alkali whereby the action of the alkali on the fluid is controlled, the reaction forming a hypochlorite for chemically purifying the cleaning fluid after which the fluid is passed through a water wash to remove free chlorine and water soluble substances. The cleaning fluid is then settled to permit the precipitation of entrained water and insoluble solid matter.

In practicing my invention I utilize apparatus, a preferred form of which is illustrated in the accompanying drawing, wherein the single figure is a vertical sectional view through the apparatus, part of which is shown in elevation.

Referring in detail to the drawing:

1 designates a cone bottomed tank for storing a cleaning fluid to be treated, preferably located below the treating apparatus, later described, and provided with a filler pipe 2, a sediment removal pipe 3, a pipe 4 for removal of the fluid, and a pipe 5 for the return of the fluid to the tank. The pipe 4 is connected through a manifold 6 with a pump 7 discharging into a line 8 connected to a washer 9 so that the liquid may be elevated from the storage tank to fill the washer and through the washer to the treating apparatus, as now described. The fluid passes from the washer through a pipe 10 to a trap 11 where any solid matter or articles from the washer may be screened out.

A circulating pump 12 elevates fluid from the trap 11 and discharges it into a charge and backflow tank 13 through a line 14, entering the bottom of the tank and terminating near its top in a gooseneck 15 to direct the fluid downwardly upon a charge of chloride of lime contained at the bottom of the tank, the fluid agitating the charge and liberating chlorine gas therefrom to act on impurities in the stream of fluid. The gas liquid and portions of the solution then pass out of the tank 13 through a pipe 16 that extends upwardly above the treating apparatus and is connected with a vertical pipe 17 extending parallel therewith and connected at its lower end with a sump 19 of an agitating tank 20.

Attention is called to the fact that the pipe 16 is of smaller diameter than the pipe 17 so that the liquid from the pipe 16 may expand in the pipe 17 and flow by gravity therethrough to the agitating tank, and so that liquid cannot be forced through the agitating tank under pump pressure, thereby eliminating static and permitting complete treatment of the fluid in the agitating tank. Should the fluid for any reason start siphoning from the tank, the siphon is broken by an inwardly opening check valve 18 located in a gooseneck above the inlet of pipe 16.

The agitating tank 20 contains an alkali, such as a soda compound, to a level indicated at 21. Fluid entering the sump rises upwardly through the alkaline solution, the chloride of lime chemically reacting with the solution to neutralize the alkali to an appreciable extent and resulting in the formation of a hypochlorite which chemically reacts with the cleaning fluid, as now described.

To insure maximum purification of the fluid by the hypochlorite, I create turbulence in the tank 20 by recirculating the fluid therein in counter currents.

In accomplishing this agitation I prefer to extend a branch pipe 22 from the pipe 17 into the tank adjacent its upper end and then downwardly to a point slightly above the level of the chemicals, so that fluid from the lower end of the pipe 17 and that from the pipe 22 flow in opposite directions to cause counter currents through the chemical, the recirculation being accomplished by a tubular baffle member 23 having flaring ends 24 and 24' and a Venturi-shaped neck 25 intermediate its ends and adjacent the terminal of the pipe 22, so that fluid entering the venturi 25 will cause fluid above the baffle member 23 to siphon through the neck and into the chemicals and then upward along the sides thereof, whereupon part of the fluid will again resiphon and the remainder will rise, because of its specific gravity, to a substantially quiescent zone in the top of the tank.

Thus it will be seen that the fluid is thoroughly circulated and washed through the chemical to become treated thereby, the hypochlorite and compounds formed thereby oxidizing the organic and other oxidizable matter contained in the cleaning fluid to purify the solvent and destroy bacteria and other organisms and any vegetable and sulphur compounds that may be carried in the solvent, the chloride of lime in the solution tending to neutralize the alkali and prevent the fluid from becoming too strongly alkaline.

The tank may also be used as a back flow receiver since any chemical that might for any reason backflow through the pipes 16 and 17 is retained in the tank 13 since, due to their specific gravity, the chemicals settle to the bottom thereof and cannot pass from the inlet of the tank through the pump 12 into the washer.

The treated fluid flows by gravity from the tank 20 through a pipe 28 leading from the top of the agitating tank into a water wash tank 29 similar to the agitation tank and containing a water wash through which the purified fluid must pass for the elimination of chemicals that may be entrained therewith. The inlet pipe 28 delivers into a baffle member 30 within the tank 29 in the same manner as the pipe 22 in the preceding tank, to cause a prolonged wash of the fluid to absorb the free chloride of lime and water soluble substances still remaining in the fluid. The fluid then passes out of the wash tank and gravitates through a pipe 31 into a precipitating tank 32, the siphoning action of the fluids being broken through vent pipes 33 and 34 on the pipes 28 and 31 respectively.

The precipitating tank allows for the separation by precipitation of moisture and insoluble solid matter carried by the solvent and comprises a container similar to the storage tank 1 and having a cone-shaped bottom 35 for collecting the precipitate. I prefer to provide a venturi-shaped baffle 36 at the end of the inlet pipe 31 similar to those in the former tanks to circulate the fluid through a portion of the tank so that the cleaning fluid rises uniformly to the top and is delivered by hydrostatic pressure due to the head carried in the agitating and water wash tanks through a pipe 37 to a filter 38. The static head is also used to remove precipitated matter through a pipe 39 extending from near the point of the cone to above ground and provided with a faucet 40 for draining off the precipitate from time to time as it accumulates in the tank.

The filter comprises a tank 41 having spaced parallel screens 42 and 43 extending across the tank and containing therebetween a filter bed 44 such as cotton waste, through which the fluid must pass before leaving the filter through a pipe 45 opening into the washer. The filtering material separates any moisture that may still remain in the fluid, the moisture settling to the bottom of the tank to be drained off through a valved pipe 46 in the bottom of the tank.

There are times when oily scums and heavy fractions collect within the filter. They are by-passed from the washer through a vertical pipe 47 mounted vertically within the filter and having a funnel-shaped head 48 at its upper end to receive the scum and an open lower end 49 adjacent the bottom of the filter to receive the heavy fraction. The pipe 47 is also provided midway its length with a T fitting connecting a valved pipe 50 with the trap 11 so that the pipe 50 may be opened to permit the scum and heavy fractions to flow back into the purifying apparatus through the trap. The trap 10 is of usual construction, being provided with a plurality of screens 51 to catch buttons, lint, and the like from the washer 9.

In operating the system above described in carrying out my process, a quantity of chloride of lime, say about 5 pounds for the average system, is dissolved in about 10 gallons of water and poured into a funnel 52 connected by a valved pipe 53 to the charge tank. The charge upon entering the funnel settles to the bottom of the tank, and a similar proportioned charge of controlled alkali, such as soda ash or the like, is supplied to the agitating tank through a manhole 54 in the top of the tank. The water wash tank is then filled about three-fourths full through a water supply line 55. The system is then ready to fill with cleaning solvent, from the supply tank, as now described.

The supply pump 7 is then started to pump the cleaning fluid from the storage tank 1 through the washer 9, pipe 10, trap 11 and circulating pump to fill the charge tank, agitating tank and wash tanks, and finally to fill the precipitating tank, from which the fluid is discharged by static head to the filter and through the filter back to the washer. As the cleaning fluid passes through the charge tank and agitating tank, it is chemically treated and purified; in the water wash tank the fluid is relieved of entrained chemicals and other solubles, the remaining foreign matter later precipitating in the precipitating tank so that the fluid when discharged into the washer is a clean, soft and purified solvent containing relatively small quantities of chlorine, hypochlorites and alkali. The supply pump is then stopped and is only used again when it is necessary to replace solvent lost from the system by vaporization or other causes.

The circulating pump, however, is continuously operated to pump the dirty solvent containing grit, bacteria, soap fats, vegetable fats and like impurities accumulated in the washer back into the purifying apparatus, where it is repurified and conditioned for return to the washer, so that the purification process is continuous as long as the washer is in operation.

When it is necessary to add new solvent to the system, a by-pass 56 in the line 8 is opened, allowing the solvent to flow into the trap for a short time to assure supply of clean solvent to the washer. However, the system may be replenished entirely through the filter by opening the by-pass 56. The old inert chemicals and sludge collecting in the bottoms of the charge, agitating and water wash tanks are drawn off through faucets 57 attached to the tanks and new charges placed therein when necessary, in which case the charge and backflow tank may be used only as a backflow tank and the chloride of lime solution placed directly in the agitating tank along with the soda solution.

By thus treating the cleaning solvent I eliminate the disagreeable aromatic components of sulphur-containing solvent which would, if present as in ordinary practice, have a deleterious effect on the health of the workmen, and provide a solvent that is free of water and suspended matter, that is water-white and has the soft, dry properties desirable for easy penetration of the fabrics to be cleaned so that a bright fluffy and resilient appearance is restored to the fabric without further spotting or other treatment of the garments.

The chemical treatment of the cleaning fluid removes uncertain elements that might react with dyes in the garments or that might tarnish metallic ornaments and trimmings. I have also found that a solvent thus treated having additional properties imparted by the treatment not present in solvents purified by ordinary methods is much safer and easier to handle, is stable, and has a higher flash point.

What I claim and desire to secure by Letters Patent is:

1. The process of treating dry cleaning fluid comprising passing cleaning fluid into contact with a chloride of lime solution for initial treatment of the fluid, passing the initially treated fluid through an alkaline solution for sterilization, passing the fluid through a water bath for removing soluble matter, passing the fluid through a quiescent zone to permit precipitation of insoluble matter, and filtering the fluid to remove entrained moisture.

2. The process of treating dry cleaning fluid comprising passing impure cleaning fluid into contact with a chlorine containing lime solution to take up constituents of the solution, delivering the fluid into an alkaline solution for sterilization, passing the fluid from the alkaline solution through a water bath for removing soluble matter, and separating the fluid from insoluble matter and entrained moisture.

3. The method of treating dry cleaning fluids including passing a stream of impure dry cleaning fluid in contact with a chlorine-containing lime solution for liberating chlorine gas to load the stream of fluid with said gas and portions of said lime solution for effecting initial treatment of the fluid, dividing the laden stream, delivering the laden streams in counter flow into a soda solution to effect agitation of the solution for producing hypochlorites and effecting action of lime carried by the fluid on said soda solution to limit the effect of the soda solution on the fluid, and washing the fluid.

4. The method of treating dry cleaning fluids including passing a stream of impure dry cleaning fluid in contact with a chlorine-containing lime solution for liberating chlorine gas and effect initial treatment of the fluid, passing the stream of fluid from the first named solution into an alkaline solution for secondary treatment of the fluid and reaction between consituents of the first named solution carried over into the alkaline solution, and washing the fluid.

In testimony whereof I affix my signature.

HARRY MILLER.